US008855140B2

(12) United States Patent
Ahn et al.

(10) Patent No.: US 8,855,140 B2
(45) Date of Patent: Oct. 7, 2014

(54) METHOD AND APPARATUS FOR CONFIGURING MINIMUM GUARANTEED BIT RATE IN WIRELESS COMMUNICATION SYSTEM

(75) Inventors: Seungjin Ahn, Gyeonggi-do (KR); Joondong Lee, Seoul (KR); Wonyong Yoon, Seoul (KR); Beomseok Cho, Seoul (KR); Woosuk Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 13/078,884

(22) Filed: Apr. 1, 2011

(65) Prior Publication Data

US 2012/0108250 A1  May 3, 2012

(30) Foreign Application Priority Data

Oct. 29, 2010 (KR) ........................ 10-2010-0106829

(51) Int. Cl.
*H04W 28/22* (2009.01)
*H04L 1/16* (2006.01)
*H04L 1/00* (2006.01)

(52) U.S. Cl.
CPC ............. *H04W 28/22* (2013.01); *H04L 1/1671* (2013.01); *H04L 1/0026* (2013.01); *H04L 1/0002* (2013.01)
USPC ....................................... 370/468

(58) Field of Classification Search
CPC .. H04L 47/14; H04W 28/0268; H04W 28/22; H04W 28/24
USPC .......................................... 370/468
See application file for complete search history.

(56) References Cited

U.S. PATENT DOCUMENTS

| 2003/0219037 | A1* | 11/2003 | Toskala et al. | 370/496 |
| 2005/0157745 | A1* | 7/2005 | Fujii et al. | 370/449 |
| 2010/0195521 | A1* | 8/2010 | Wanstedt et al. | 370/252 |
| 2011/0244839 | A1* | 10/2011 | Poltorak | 455/414.2 |

* cited by examiner

*Primary Examiner* — Benjamin Lamont
(74) *Attorney, Agent, or Firm* — Lee, Hong, Degerman, Kang & Waimey

(57) ABSTRACT

A method for configuring bit rate in a user equipment (UE) for use in a wireless communication system includes receiving guaranteed bit rate information comprising one or more bit rates which are supported by a base station (BS) for communications with the UE, selecting a minimum guaranteed bit rate responsive to user input received at the UE, the minimum guaranteed bit rate being a bit rate identified by the guaranteed bit rate information, generating a first request message requesting the selected minimum guaranteed bit rate, transmitting the first request message from the UE to the BS, the first request message including a request for receiving communications from the BS at the selected minimum guaranteed bit rate, receiving a response message from the BS in response to the first request message, and receiving data from the BS at a bit rate which is at or greater than the selected minimum guaranteed bit rate when the response message comprises an acknowledgement (ACK) message.

14 Claims, 10 Drawing Sheets

FIG. 2
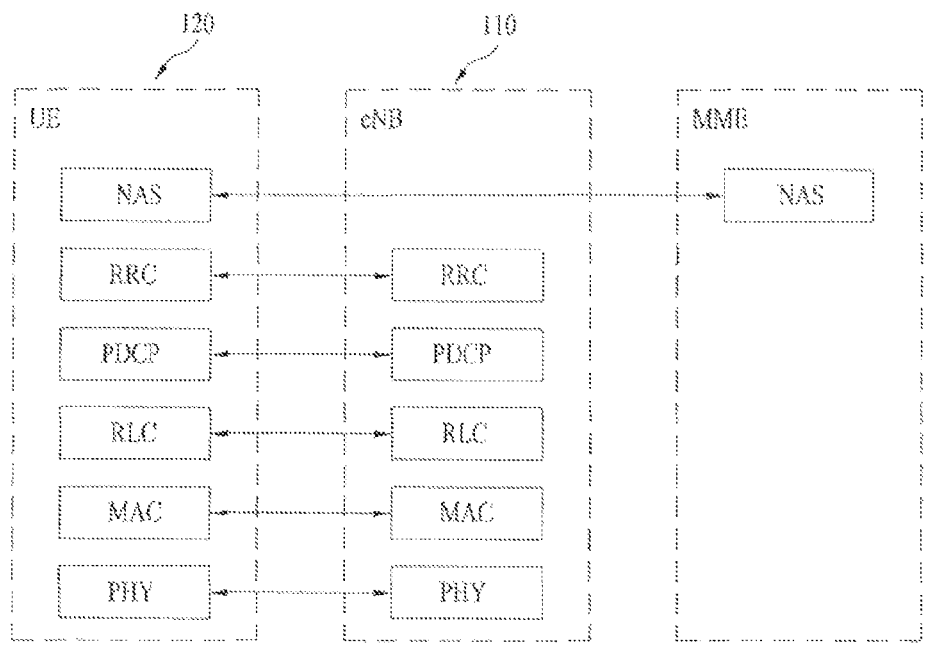
a) Control Plane Protocol Stack
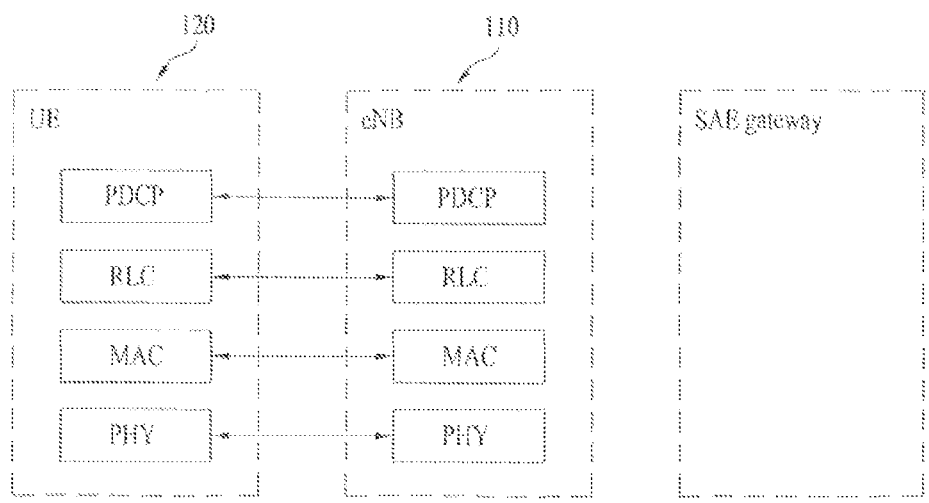
b) User Plane Protocol Stack

METHOD AND APPARATUS FOR CONFIGURING MINIMUM GUARANTEED BIT RATE IN WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Patent Application No. 10-2010-0106829, filed on Oct. 29, 2010, the contents of which is hereby incorporated by reference herein in its entirety.

FIELD OF THE INVENTION

The present invention relates to a wireless communication system, and more particularly to a method and apparatus for configuring a minimum guaranteed bit rate in a wireless communication system.

DISCUSSION OF THE RELATED ART

As a representative example of a mobile communication system of the present invention, a $3^{rd}$ Generation Partnership Project Long Term Evolution (3GPP LTE) communication system will be described.

FIG. 1 is a conceptual diagram illustrating an Enhanced Universal Mobile Telecommunications System (E-UMTS) network structure as an exemplary mobile communication system. In particular, the E-UMTS has evolved from a legacy UMTS system, and basic standardization thereof is now being conducted by the 3rd Generation Partnership Project (3GPP).

E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network."

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE so as to inform the corresponding UE of time/frequency domains where data is to be transmitted, coding information, data size information, Hybrid Automatic Repeat and reQuest (HARM)-related information, and the like. In association with uplink (UL) data, the eNode-B transmits UL scheduling information to the corresponding UE so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, the number of requests and expectation of users and enterprises is rapidly increasing. In addition, other wireless access technologies are being developed, such that there is needed a new or improved wireless access technology in order to remain competitive in the long run. For example, reduction in cost per bit, increase of service availability, adaptive frequency band utilization, a simple structure, an open-type interface, and appropriate power consumption of user equipment (UE) are needed for the new or improved wireless access technology.

SUMMARY OF THE INVENTION

Accordingly, the present invention is directed to a method and apparatus for configuring a minimum guaranteed bit rate in a wireless communication system that substantially obviate one or more problems due to limitations and disadvantages of the related art.

According to an embodiment of the present invention, A method for configuring bit rate in a user equipment (UE) for use in a wireless communication system includes receiving guaranteed bit rate information including one or more bit rates which are supported by a base station (BS) for communications with the UE, selecting a minimum guaranteed bit rate responsive to user input received at the UE, the minimum guaranteed bit rate being a bit rate identified by the guaranteed bit rate information, generating a first request message requesting the selected minimum guaranteed bit rate, transmitting the first request message from the UE to the BS, the first request message including a request for receiving communications from the BS at the selected minimum guaranteed bit rate, receiving a response message from the BS in response to the first request message, and receiving data from the BS at a bit rate which is at or greater than the selected minimum guaranteed bit rate when the response message comprises an acknowledgement (ACK) message.

In another embodiment of the present invention, a user equipment (UE) apparatus for use in a wireless communication system includes a receiver receiving guaranteed bit rate information from a base station (BS), the guaranteed bit rate information including one or more bit rates which are supported by the BS for communications with the UE, a user input unit receiving user input, a processor selecting a minimum guaranteed bit rate responsive to the user input, wherein the minimum guaranteed bit rate is a bit rate identified by the guaranteed bit rate information, and generating a first request message requesting the selected minimum guaranteed bit rate, and a transmitter transmitting the first request message to the BS, the first request message including a request for receiving communications from the BS at the selected minimum guaranteed bit rate. In the UE, the receiver further receives a response message from the BS in response to the first request message, and also receives data from the BS at a bit rate which is at or greater than the selected minimum guaranteed bit rate when the response message comprises an acknowledgement (ACK) message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 illustrates a) a control plane and b) a user plane (U-Plane) of a radio interface protocol between a User Equipment (UE) and an E-UTRAN according to the 3GPP wireless access network standard.

DESCRIPTION OF PREFERRED EMBODIMENTS

Figure 1:
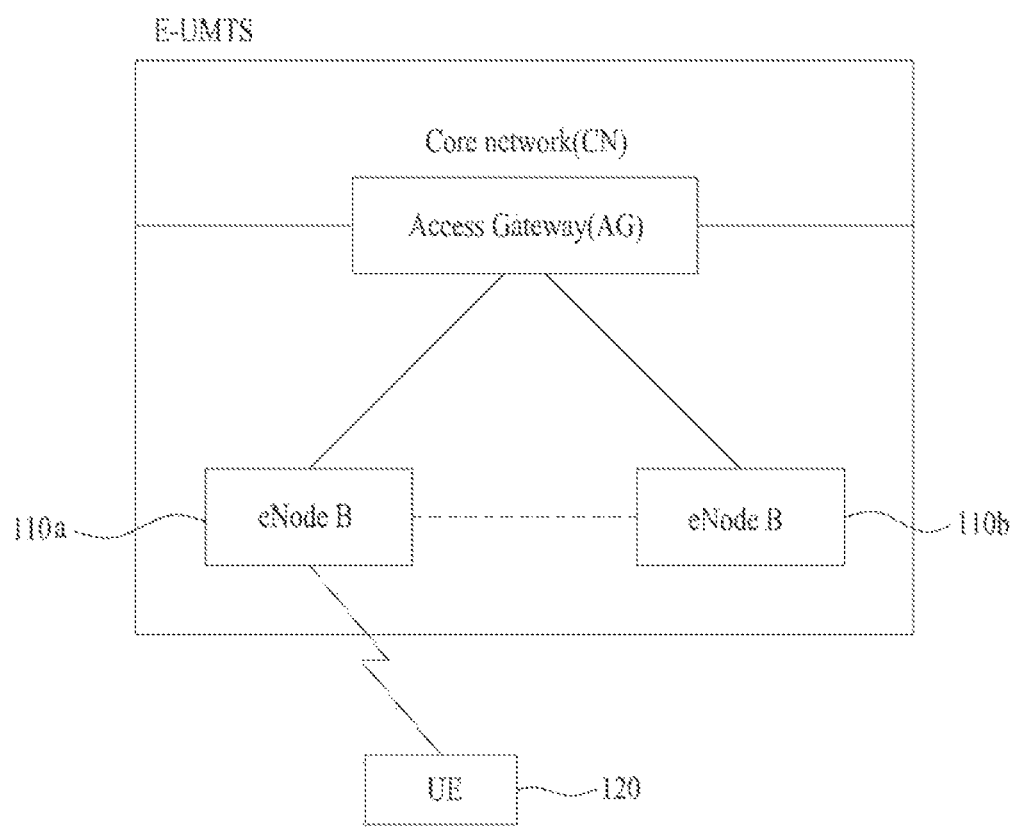
FIG. 1 is a conceptual diagram illustrating an Evolved Universal Mobile Telecommunications System (E-UMTS) network structure as an example of a mobile communication system.

Reference will now be made in detail to the preferred embodiments of the present invention, examples of which are illustrated in the accompanying drawings. Wherever possible, the same reference numbers will be used throughout the drawings to refer to the same or like parts.

The above and other configurations, operations, and features of the present invention will be easily understood from the embodiments of the invention described below with reference to the accompanying drawings. The embodiments described below are examples wherein technical features of the invention are applied to a $3^{rd}$ Generation Partnership Project (3GPP) system.

FIG. 2 illustrates a) a control plane and b) a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A Packet Data Convergence Protocol (PDCP) layer of the second layer performs a header compression function to reduce unnecessary control information in order to efficiently transmit Internet Protocol (IP) packets such as IPv4 or IPv6 packets over a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in RRC connected mode if an RRC connection has been established between the RRC layer of the network and the RRC layer of the UE. Otherwise, the UE is in RRC idle mode. A Non-Access Stratum (NAS) layer located above the RRC layer performs functions such as session management and mobility management.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
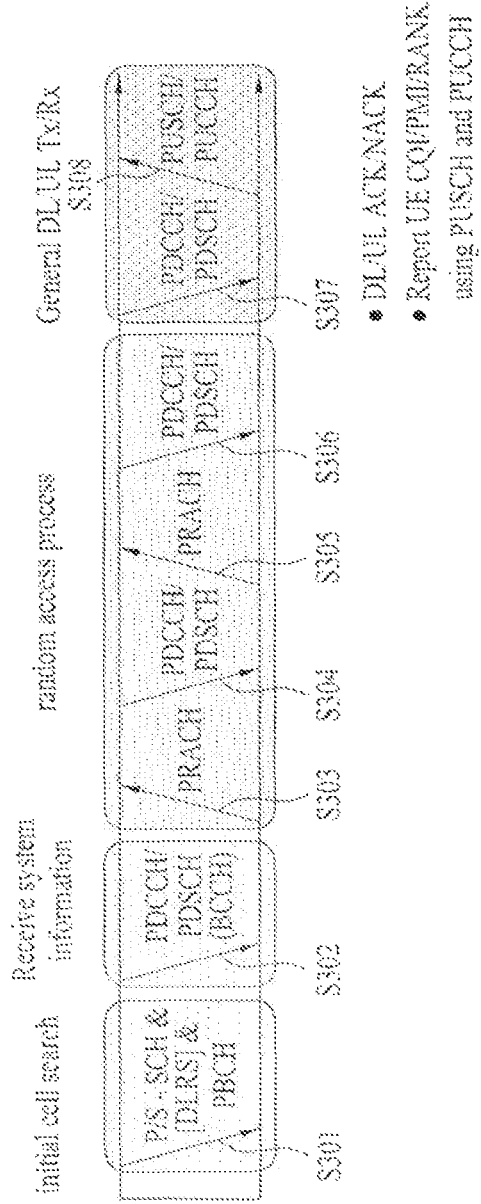
FIG. 3 is a conceptual diagram illustrating physical channels for use in a 3GPP system and a general method for transmitting a signal using the physical channels.

FIG. 3 illustrates physical channels for use in a 3GPP system and a general method for transmitting a signal using the physical channels. Referring to FIG. 3, when powered on or when entering a new cell, a UE performs initial cell search (S301). The initial cell search involves synchronization with a base station (BS). Specifically, the UE synchronizes its timing with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH (S302).

On the other hand, if the UE initially accesses the BS or if the UE does not have radio resources for signal transmission, it may perform a random access procedure to the BS (S303 to S306). For the random access, the UE may transmit a predetermined sequence as a preamble to the BS on a Physical Random Access CHannel (PRACH) (S303 and S305) and receive a response message for the random access on a PDCCH and a PDSCH corresponding to the PDCCH (S304 and S306). In the case of contention-based RACH, the UE may perform a contention resolution procedure.

After the foregoing procedure, the UE may receive a PDCCH and a PDSCH (S307) and transmit a Physical Uplink Shared CHannel (PUSCH) and a Physical Uplink Control CHannel (PUCCH) (S308), as a general downlink/uplink (DL/UL) signal transmission procedure. Here, uplink control information transmitted from the UE to the BS or downlink control information transmitted from the UE to the BS may include a downlink (DL) or uplink (UL) ACKnowledgement/Negative ACKnowledgement (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Generally, a service provided via circuit switching (CS) indicates a voice service, a text service, a video communication service, and the like. A service provided via packet switching (PS) indicates Web browsing, FTP, VoIP, and the like. Although the PS service exists in a legacy 3G or 2G network, and a Quality of Service (QoS) concept also exists in the legacy 3D or 2G network. Therefore, although the minimum guaranteed bit rate exists, it is not guaranteed for a predetermined period of time.

Typically, from the viewpoint of the PS service, it is considered that the base station (BS) or the eNode-B does not support the adjusting of priority between users or UEs. For example, it is considered that a method for continuously providing the bit rate of 10 Mbps to a first user A and providing another bit rate of 20 Mbps to a second user B over an FTP under the same wireless condition. Assuming that a certain user must receive necessary information within a few minutes through the FTP and several users are concentrated in the region of the corresponding eNode-B under favorable wireless conditions, there occurs an unexpected problem in which a desired bit rate may not be allocated. From the viewpoint of a service provider, the service provider may unexpectedly lose the opportunity to provide a better service environment or to assess much more usage fees to users or subscribers.

In recent times, the QoS concept similar to the LTE has been introduced into a legacy network other than the LTE so that a minimum guaranteed bit rate (GBR) for users can be guaranteed. However, the GBR is used to prevent an excessively high bit rate from being allocated to a specific UE according to a method for equally distributing resources among users, instead of allocating priority to users according to a user request.

In order to solve the above-mentioned problems, an entity such as a Policy and Charging Rules Function (PCRF) is added to the LTE. Typically, for payment of fees, a time per second is measured or transmission/reception (Tx/Rx) data is measured in bytes, the entity such as PCRF need not be used. However, QoS can be adjusted in consideration of a user request and a system condition, and a PCRF for more effectively setting fees in response to the adjusted QoS is also added to the LTE.

The following Table 1 shows a guaranteed bit rate (GBR) for use in the LTE.

TABLE 1

| QCI | Resource Type | Priority | Packet Delay Budget (NOTE 1) | Packet Error Loss Rate (NOTE 2) | Example Services |
|---|---|---|---|---|---|
| 1 (NOTE 3) |  | 2 | 100 ms | $10^{-2}$ | Conversational Voice |
| 2 (NOTE 3) | GBR | 4 | 150 ms | $10^{-3}$ | Conversational Video (Live streaming) |
| 3 (NOTE 3) |  | 3 | 50 ms | $10^{-3}$ | Real Time Gaming |
| 4 (NOTE 3) |  | 5 | 300 ms | $10^{-6}$ | Non-Conversational Video (Buffered Streaming) |
| 5 (NOTE 3) |  | 1 | 100 ms | $10^{-6}$ | IMS Signalling |
| 6 (NOTE 4) |  | 6 | 300 ms | $10^{-6}$ | Video (Buffered Streaming) TCP-based (e.g., www, e-mail, chat, ftp, p2p file sharing, progressive video, etc.) |
| 7 (NOTE 3) | Non-GBR | 7 | 100 ms | $10^{-3}$ | Voice, Video (Live Streaming) Interactive Gaming |
| 8 (NOTE 5) |  | 8 |  |  | Video (Buffered Streaming) |
| 9 (NOTE 6) |  | 9 | 300 ms | $10^{-6}$ | TCP-based (e.g., www, e-mail, chat, ftp, p2p file sharing, progressive video, etc.) |

Referring to Table 1, there are two bearer resource types, i.e., a first bearer resource type in which a core network (CN) allocates bearer resources using a GBR format, and a second bearer resource type in which a core network (CN) allocates bearer resources using the conventional scheme. The GBR-related information is generally contained in a NAS (Non Access Stratum) signaling message, QoS-related information is pre-allocated by the eNode-B, and the UE may ask the eNode-B to change its own QoS (e.g., GBR). In accordance with the present invention, the user may establish bit rate information desired by the user, and transmit the established bit rate information through the NAS signaling message. However, it should be noted that, even when a user requests a desired bit rate, the BS does not unconditionally accept the user-desired bit rate.

Tables 2 and 3 show definitions of bearer resource allocation request messages of the 3GPP TS 24.301. Specifically, Table 2 shows messages that are transmitted from the UE to the network in an initial bearer configuration mode, and Table 3 shows bearer modification messages that are transmitted from the UE to the network after the initial bearer configuration.

to the "Required traffic flow QoS" field, it is possible to change bearer resource information during network access.

Figure 4:
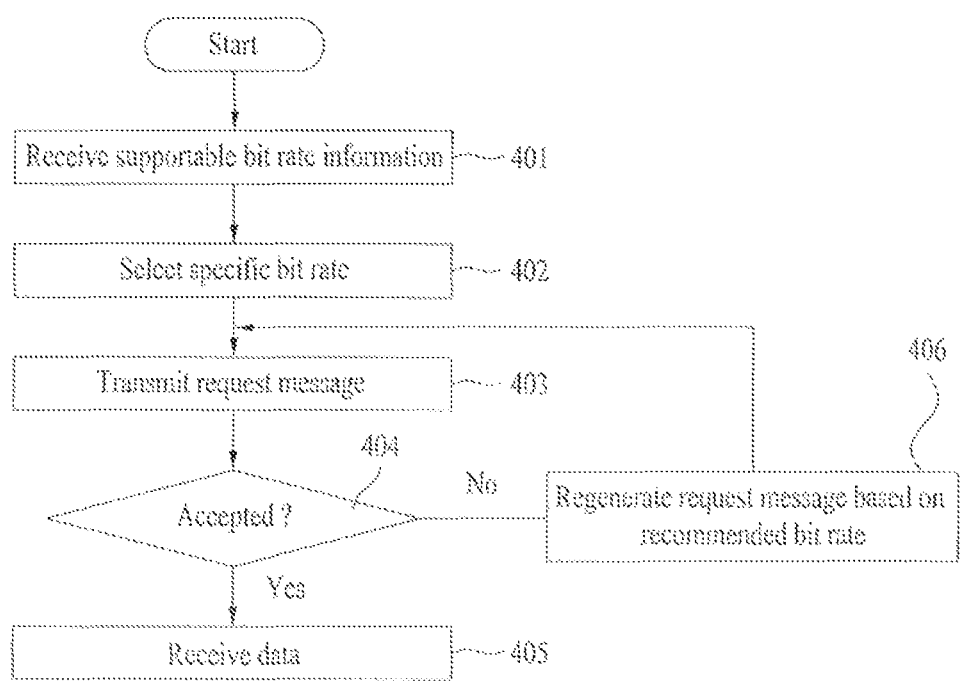
FIG. 4 is a flowchart illustrating a method for controlling a UE to select a minimum guaranteed bit rate according to one embodiment of the present invention.

FIG. 4 illustrates a method for controlling a UE to select a minimum guaranteed bit rate according to one embodiment of the present invention. Referring to FIG. 4, the UE can

TABLE 2

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Bearer resource allocation request message identity | Message type 9.8 | M | V | 1 |
| | Linked EPS bearer identity | Linked EPS bearer identity 9.9.4.6 | M | V | ½ |
| | Spare half octet | Spare half octet 9.9.2.9 | M | V | ½ |
| | Traffic flow aggregate | Traffic flow aggregate description 9.9.4.15 | M | LV | 2-256 |
| | Required traffic flow QoS | EPS quality of service 9.9.4.3 | M | LV | 2-10 |
| 27 | Protocol configuration options | Protocol configuration options 9.9.4.11 | O | TLV | 3-253 |

In Table 2, a "Traffic flow aggregate" field, a "Required traffic flow QoS" field, and a "Protocol configuration options" field indicate QoS-related parameters (i.e., parameters related to a bit rate). In the case of using the above-mentioned fields, a user request related to a minimum guaranteed bit rate may be transferred to the eNode-B. For example, assuming that the eNode-B can accept the corresponding NAS signaling message, the eNode-B may generate an acknowledgement (ACK) message in response to the NAS signaling message. Otherwise, assuming that the eNode-B has difficulty in accepting the corresponding NAS signaling message, the eNode-B may generate a negative acknowledgement (NACK) message in response to the NAS signaling message. In another example, another method may also be used, which establishes a low bit rate that is similar to a requested bit rate and can be accepted, and generates an acknowledgement (ACK) message as a response message.

receive supportable bit rate information from the eNode-B (401). In this case, the bit rate information may be represented in the form of a list of specific values, or may be represented in the form of a specific-range list. For example, bit rate information may be represented by a list of specific values, for example, 1 Mbps, 3 Mbps, 5 Mbps and 7 Mbps, or may also be represented by the range of 1 Mbps~2 Mbps or 3 Mbps~5 Mbps.

The UE displays the above-mentioned supportable bit rate information on a display module (402). The UE receives a specific bit rate or specific bit rate range from the user. Continuously, the UE generates a request message using the selected bit rate and transmits the request message to the network.

The network receives the request message, and thus, determines whether the selected bit rate can be guaranteed. If it is

TABLE 3

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Bearer resource modification request message identity | Message type 9.8 | M | V | 1 |
| | EPS bearer identity for packet filter | Linked EPS bearer identity 9.9.4.6 | M | V | ½ |
| | Spare half octet | Spare half octet 9.9.2.9 | M | V | ½ |
| | Traffic flow aggregate | Traffic flow aggregate description 9.9.4.15 | M | LV | 2-256 |
| 5B | Required traffic flow QoS | EPS quality of service 9.9.4.3 | O | TLV | 3-11 |
| 58 | ESM cause | ESM cause 9.9.4.4 | O | TV | 2 |
| 27 | Protocol configuration options | Protocol configuration options 9.9.4.11 | O | TLV | 3-253 |

In Table 3, assuming that a "Required traffic flow QoS" field is a QoS-related parameter for changing bearer configuration and a request signal for changing bit rate is transferred possible to guarantee the selected bit rate, the network generates an acknowledgement (ACK) message and transmits it to the UE. Otherwise, if it is impossible to guarantee the selected bit rate, the network generates a non-acknowledgement (NACK) response message and transmits it to the UE. In this case, it is preferable that the NACK response message includes a recommended bit rate. The recommended bit rate may be located underneath a rejected bit rate from among bit rates contained in the supportable bit rate information. Otherwise, the network may include an optimum bit rate value determined by the network itself.

Upon receiving the response message, the UE determines whether the response message is an ACK message or a NACK message (404). If the response message is determined to be the ACK message, the UE can receive data on the basis of the selected bit rate (405). Meanwhile, if the response message is determined to be the NACK message, the UE again generates a request message on the basis of the recommended bit rate value contained in the NACK message (406), and may perform the operation of a bit rate configuration in relation to the network.

Figure 5:
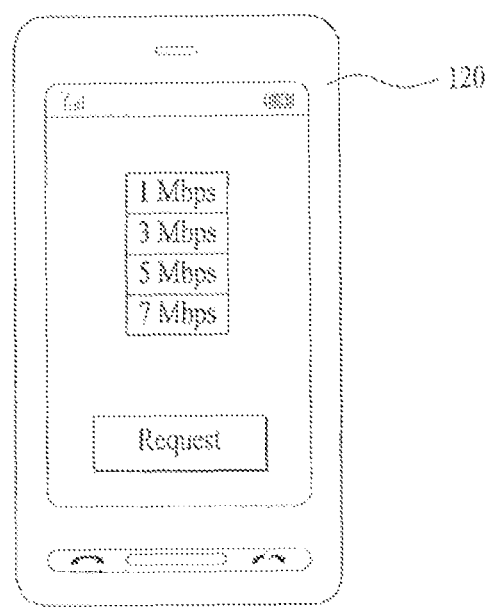
FIG. 5 is a diagram illustrating a method for controlling a UE to select a minimum guaranteed bit rate according to one embodiment of the present invention.

FIG. 5 illustrates a method for controlling a UE to select a minimum guaranteed bit rate according to one embodiment of the present invention. Referring to FIG. 5, the UE may display bit rate information supported by the eNode-B such that it can receive a minimum guaranteed bit rate from the user. Although FIG. 5 shows displaying a specific bit rate and receives an input signal from the user, it may also be possible for the user to directly enter a desired input value. In this case, the UE may generate a request message on the basis of a bit rate most similar to the input bit rate. Otherwise, the UE may generate a request message on the basis of the input bit rate, or the eNode-B may generate a response message using the most similar bit rate from among the supportable bit rates based on a bit rate contained in the request message.

Figure 6:
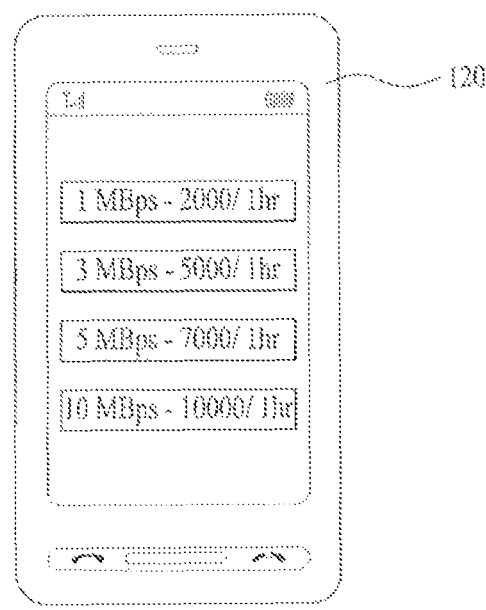
FIG. 6 is a diagram illustrating a method for controlling a UE to select a minimum guaranteed bit rate according to another embodiment of the present invention.

FIG. 6 illustrates a method for controlling a UE to select a minimum guaranteed bit rate according to another embodiment of the present invention. In FIG. 6, the eNode-B may include fee information corresponding to each bit rate in bit rate information supported from the eNode-B to the UE. Therefore, the UE may display fee information along with the selectable bit rate so that the user can use the displayed fee information as a decision reference.

If the response message received from the eNode-B is an acknowledgement (ACK) response message, the UE can receive a downlink (DL) signal on the basis of the corresponding bit rate. In contrast, if the response message received from the eNode-B is a negative acknowledgement (NACK) response message, it is preferable that the NACK response message include information that can be used as a reference for deciding a bit rate for a user.

Figure 7:
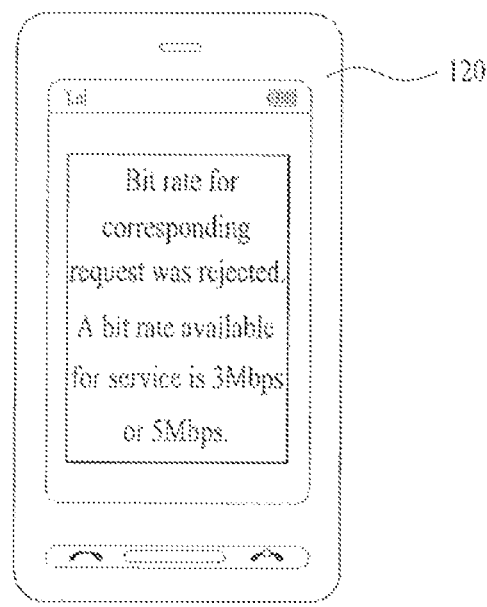
FIG. 7 shows a non-acknowledgement (NACK) response message according to one embodiment of the present invention.

FIG. 7 shows a negative acknowledgement (NACK) response message according to one embodiment of the present invention. Although the user-selected bit rate is rejected in a network as shown in FIG. 7, it may further include specific information about whether a supportable bit rate lower than the rejected bit rate exists or other information about which bit rate can be accepted.

Figure 8A:
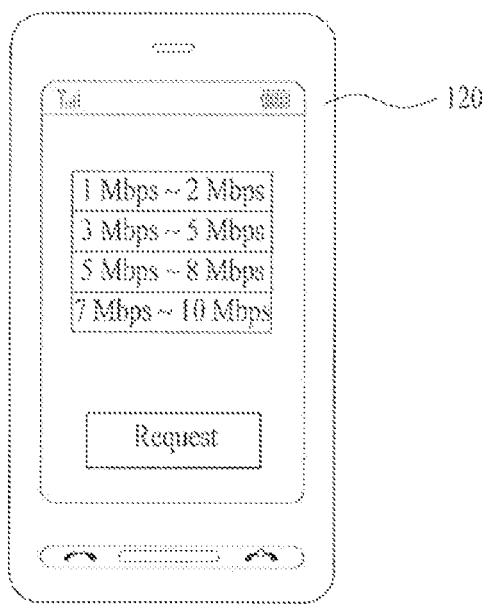
FIGS. 8A and 8B are diagrams illustrating a method for controlling a UE to select a minimum guaranteed bit rate according to another embodiment of the present invention.
Figure 8B:
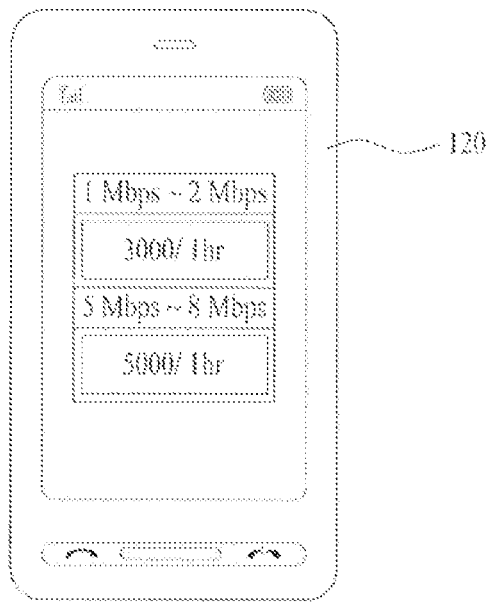

FIGS. 8A and 8B illustrate a method for controlling a UE to select a minimum guaranteed bit rate according to another embodiment of the present invention. Specifically, FIGS. 8A and 8B are characterized in that bit rate information provided from the network is information about a specific range instead of a specific value. In this case, a minimum value of the specific range may be denoted by a minimum guaranteed bit rate, and a maximum value thereof may be denoted by a maximum guaranteed bit rate implementable with the corresponding fee. In addition, the concept of FIG. 8B is characterized in that specific bit rate range information and associated fee information are also provided.

Figure 9:
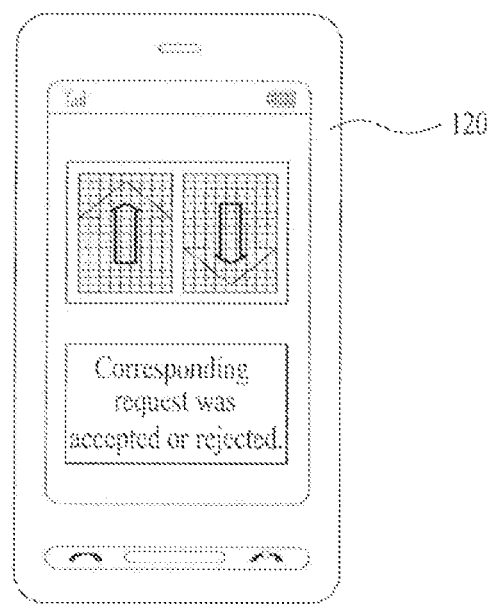
FIG. 9 is a diagram illustrating a method for controlling a UE to select a minimum guaranteed bit rate according to still another embodiment of the present invention.

FIG. 9 illustrates a method for controlling a UE to select a minimum guaranteed bit rate according to still another embodiment of the present invention. Referring to FIG. 9, a user may configure a desired bit rate value to be guaranteed using an arrow-button-type input unit instead of selecting a specific value in a bit rate list. In this case, preferably, the UE may transmit a request message to the eNode-B whenever the bit rate value is changed, and then display the ACK or NACK response message in response to the request message. More preferably, the UE may further display the user's accumulated charges for the current billing period.

On the other hand, it is assumed that the user may establish a guaranteed bit rate, for example, 7 Mbps~10 Mbps, the corresponding request is accepted such that one movie is downloaded through FTP. In this case, if the actually transmitted bit rate is only 5 Mbps, that is, if the actually transmitted bit rate is less than 7 Mbps, the guaranteed bit rate is changed to 5 Mbps~7 Mbps in response to the actually transmitted bit rate, such that fees are rationally assessed and the assessed fees can be notified to the user. In addition, assuming that a wireless environment is improved so that the bit rate can be increased, the guaranteed bit rate may be changed to a bit rate value initially established by the user, or the user may be notified of the changed bit rate value.

Figure 10:
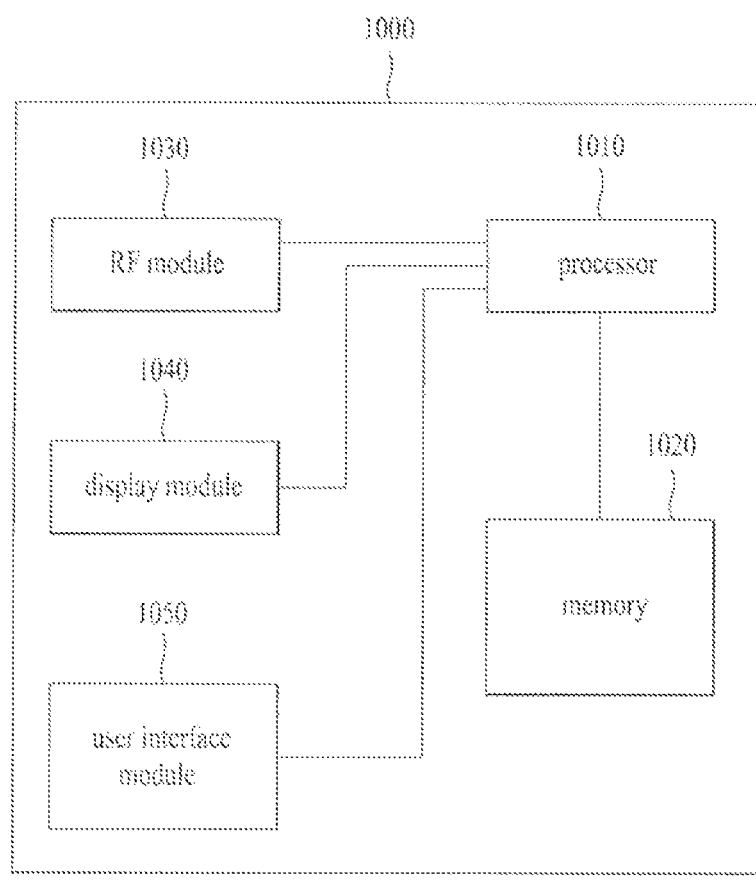
FIG. 10 is a block diagram illustrating a communication transceiver according to one embodiment of the present invention.

FIG. 10 illustrates a communication transceiver according to one embodiment of the present invention. In FIG. 10, the transceiver may be a part of the eNode-B or a part of the UE. Referring to FIG. 10, the transceiver 1000 includes a processor 1010, a memory 1020, a Radio Frequency (RF) module 1030, a display module 1040, and a user interface (UI) module 1050.

The transceiver 1000 is disclosed only for illustrative purposes, and certain modules may also be omitted from the transceiver 1000 as necessary. Further, the transceiver 1000 may further include additional necessary modules. Some modules of the transceiver 1000 may be identified as more detailed modules. The processor 1010 is configured to carry out the operations of the embodiments of the present invention.

In more detail, if the transceiver 1000 is a part of the eNode-B, the processor 1010 can generate a control signal, and map the generated control signal to a control channel established in several frequency blocks. In addition, if the transceiver 1000 is a part of the UE, the processor 1010 confirms an indicated control channel upon receiving a signal from several frequency blocks, and extracts a control signal from the confirmed control channel.

Thereafter, the processor 1010 may perform a necessary operation on the basis of the control signal. For detailed operations of the processor 1010 reference may be made to FIGS. 1 to 9.

The memory 1020 is connected to the processor 1010, and stores an operating system, an application, program code, data and the like. The RF module 1030 is connected to the processor 1010, converts a baseband signal into a radio frequency (RF) signal, or converts the RF signal into the baseband signal. For these operations, the RF module 1030 performs analog conversion, amplification, filtering, and frequency up-conversion in order or performs such operations in reverse order. The display module 1040 is connected to the processor 1010 and displays a variety of information. The scope or spirit of the display module 1040 of the present invention is not limited thereto, and the display module 1040 may be any of well-known elements, for example, a Liquid Crystal Display (LCD), a Light Emitting Diode (LED), an Organic Light Emitting Diode (OLED) and the like. The user interface (UI) module 1050 is connected to the processor 1010, and may be implemented as a combination of user interfaces such as a keypad, a touchscreen, and the like.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station may also be conducted by an upper node of the base station as necessary. In other words, it is understood to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

Various aspects presented herein can be applied to a wireless communication system that includes a method for controlling a UE to report residual transmission power and an apparatus thereof.

As apparent from the above description, certain embodiments of the present invention relate to a method and apparatus for configuring a minimum guaranteed bit rate in a wireless communication system, such that a UE of the wireless communication system can effectively configure a minimum guaranteed bit rate capable of being supplied from a base station (BS), and can stably receive a necessary service.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention. Thus, it is intended that the present invention covers the modifications and variations of this invention provided they come within the scope of the appended claims and their equivalents.

What is claimed is:

1. A method for configuring bit rate in a user equipment (UE) for use in a wireless communication system, the method comprising:
   receiving guaranteed bit rate information from a base station (BS), the guaranteed bit rate information comprising one or more bit rates that are supported by the BS for communications with the UE;
   displaying each value of the one or more bit rates included in the guaranteed bit rate information received from the BS on a display of the UE;
   selecting one of the displayed one or more bit rates as a minimum guaranteed bit rate in response to user input received at the UE;
   generating a first request message requesting the selected minimum guaranteed bit rate;
   transmitting the first request message from the UE to the BS, the first request message including a request for receiving communications from the BS at the selected minimum guaranteed bit rate;
   receiving a response message from the BS in response to the first request message;
   receiving data from the BS at a bit rate, which is at or greater than the selected minimum guaranteed bit rate, when the response message comprises an acknowledgement (ACK) message; and
   displaying each value of at least one recommended bit rate on the display when the response message comprises a negative acknowledgement (NACK) message, wherein the NACK message includes information about the at least one recommended bit rate, and wherein the at least one recommended bit rate that is supported by the BS is less than the minimum guaranteed bit rate.

2. The method according to claim 1, wherein each value of the one or more bit rates that is displayed on the display includes a numeric value.

3. The method according to claim 2, wherein the value is displayed as a plurality of ranges of bit rates.

4. The method according to claim 2, wherein the guaranteed bit rate information further comprises information about a service fee corresponding to each of the one or more bit rates.

5. The method according to claim 1, further comprising:
   receiving a bit rate change request message from the BS when the bit rate falls below the minimum guaranteed bit rate while receiving the data.

6. The method according to claim 1, further comprising:
   generating a second request message for changing the minimum guaranteed bit rate to a different value while receiving the data; and
   transmitting the second request message to the BS.

7. The method according to claim 1, further comprising:
generating a second request message requesting the recommended bit rate; and
transmitting the second request message to the BS.

8. A user equipment (UE) apparatus for use in a wireless communication system, the UE apparatus comprising:
- a receiver configured to receive guaranteed bit rate information from a base station (BS), the guaranteed bit rate information comprising one or more bit rates that are supported by the BS for communications with the UE;
- a user input unit configured to receive user input;
- a display configured to display each value of the one or more bit rates included in the guaranteed bit rate information received from the BS;
- a processor configured to select one of the displayed one or more bit rates as a minimum guaranteed bit rate in response to the user input and to generate a first request message requesting the selected minimum guaranteed bit rate; and
- a transmitter configured to transmit the first request message to the BS, the first request message including a request for receiving communications from the BS at the selected minimum guaranteed bit rate,
wherein the receiver is further configured to receive a response message from the BS in response to the first request message, and to receive data from the BS at a bit rate, which is at or greater than the selected minimum guaranteed bit rate, when the response message comprises an acknowledgement (ACK) message,
wherein the processor is further configured to cause the display to display each value of at least one recommended bit rate when the response message comprises a negative acknowledgement (NACK) message, wherein the NACK message includes information about the at least one recommended bit rate, and wherein the at least one recommended bit rate that is supported by the BS is less than the minimum guaranteed bit rate.

9. The UE apparatus according to claim 8, wherein each value of the one or more bit rates that is displayed on the display includes a numeric value.

10. The UE apparatus according to claim 9, wherein the value is displayed as a plurality of ranges of bit rates.

11. The UE apparatus according to claim 9, wherein the guaranteed bit rate information further comprises information about a service fee corresponding to each of the one or more bit rates.

12. The UE apparatus according to claim 8, wherein the receiver is further configured to receive a bit rate change request message from the BS when the bit rate falls below the minimum guaranteed bit rate while receiving the data.

13. The UE apparatus according to claim 8, wherein the processor is further configured to generate a second request message for changing the minimum guaranteed bit rate to a different value while receiving the data, and the transmitter is further configured to transmit the second request message to the BS.

14. The UE apparatus according to claim 8, wherein the processor is further configured to generate a second request message for requesting the recommended bit rate, and the transmitter is further configured to transmit the second request message to the BS.

* * * * *